United States Patent
Miyata et al.

(10) Patent No.: US 9,372,105 B2
(45) Date of Patent: Jun. 21, 2016

(54) ULTRASONIC FLOW RATE MEASUREMENT DEVICE

(75) Inventors: Hajime Miyata, Kyoto (JP); Makoto Nakano, Kyoto (JP); Yuji Fujii, Nara (JP); Yukinori Ozaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

(21) Appl. No.: 13/984,633

(22) PCT Filed: Apr. 4, 2012

(86) PCT No.: PCT/JP2012/002334
§ 371 (c)(1),
(2), (4) Date: Aug. 9, 2013

(87) PCT Pub. No.: WO2012/137489
PCT Pub. Date: Oct. 11, 2012

(65) Prior Publication Data
US 2013/0312537 A1      Nov. 28, 2013

(30) Foreign Application Priority Data
Apr. 5, 2011 (JP) .................................. 2011-083297

(51) Int. Cl.
*G01F 1/66* (2006.01)
*G01F 15/14* (2006.01)

(52) U.S. Cl.
CPC ...... *G01F 1/66* (2013.01); *G01F 1/662* (2013.01); *G01F 15/14* (2013.01)

(58) Field of Classification Search
CPC ............ G01F 1/662; G01F 1/667; G01F 1/66
USPC ....................................... 73/861.28
See application file for complete search history.

(56) References Cited

U.S. PATENT DOCUMENTS

| | | | |
|---|---|---|---|
| 5,777,237 A * | 7/1998 | Collier | G01F 1/662 73/861.27 |
| 6,748,811 B1 | 6/2004 | Iwanaga et al. | |

(Continued)

FOREIGN PATENT DOCUMENTS

| | | |
|---|---|---|
| EP | 1182431 A1 | 2/2002 |
| EP | 1612520 A1 | 1/2006 |

(Continued)

OTHER PUBLICATIONS

Extended Search Report from corresponding European application serial No. 12767854.8, dated Jul. 24, 2014, 6 pages.

(Continued)

*Primary Examiner* — Hezron E Williams
*Assistant Examiner* — Rodney T Frank
(74) *Attorney, Agent, or Firm* — Brinks Gilson & Lione

(57) ABSTRACT

An ultrasonic flow rate measurement device includes a measurement channel, through which a fluid to be measured flows; and a sensor fixing casing having openings formed in the measurement channel and sensor fixing cavities communicating with the openings. Moreover, the ultrasonic flow rate measurement device includes a pair of ultrasonic sensors contained in the sensor fixing cavities, for measuring the flow rate of the fluid to be measured; and a flow rate measuring unit for detecting the flow rate based on an ultrasonic wave propagation time between the pair of ultrasonic sensors. Furthermore, the ultrasonic flow rate measurement device includes a suppressing member formed at each of the openings, for suppressing the fluid to be measured from intruding into each of the sensor fixing cavities, wherein the suppressing member is molded integrally with the sensor fixing casing.

7 Claims, 15 Drawing Sheets

(56) References Cited

U.S. PATENT DOCUMENTS

| | | | |
|---|---|---|---|
| 6,796,189 B1* | 9/2004 | Umekage | G01F 1/66 73/861.27 |
| 2005/0139013 A1* | 6/2005 | Hashimoto | G01F 1/662 73/861.27 |
| 2006/0156828 A1* | 7/2006 | Konzelmann | G01F 1/662 73/861.25 |
| 2007/0034016 A1* | 2/2007 | Maginnis | G01F 1/662 73/861.28 |
| 2009/0178490 A1* | 7/2009 | Konzelmann | G01F 1/662 73/861.29 |
| 2010/0192702 A1 | 8/2010 | Satou et al. | |
| 2011/0238333 A1 | 9/2011 | Miyata et al. | |

FOREIGN PATENT DOCUMENTS

| | | |
|---|---|---|
| EP | 1867964 A1 | 12/2007 |
| JP | 63-026537 A | 2/1988 |
| JP | 2004-101542 A | 4/2004 |
| JP | 2006-090952 A | 4/2006 |
| JP | 2009-014672 A | 1/2009 |
| JP | 2009-288151 A | 12/2009 |
| JP | 2010-164558 A | 7/2010 |
| WO | WO 00/55581 A1 | 9/2000 |

OTHER PUBLICATIONS

International Search Report for International Application No. PCT/JP2012/002334, dated Jun. 26, 2012, 2 pages.

* cited by examiner

FIG. 5
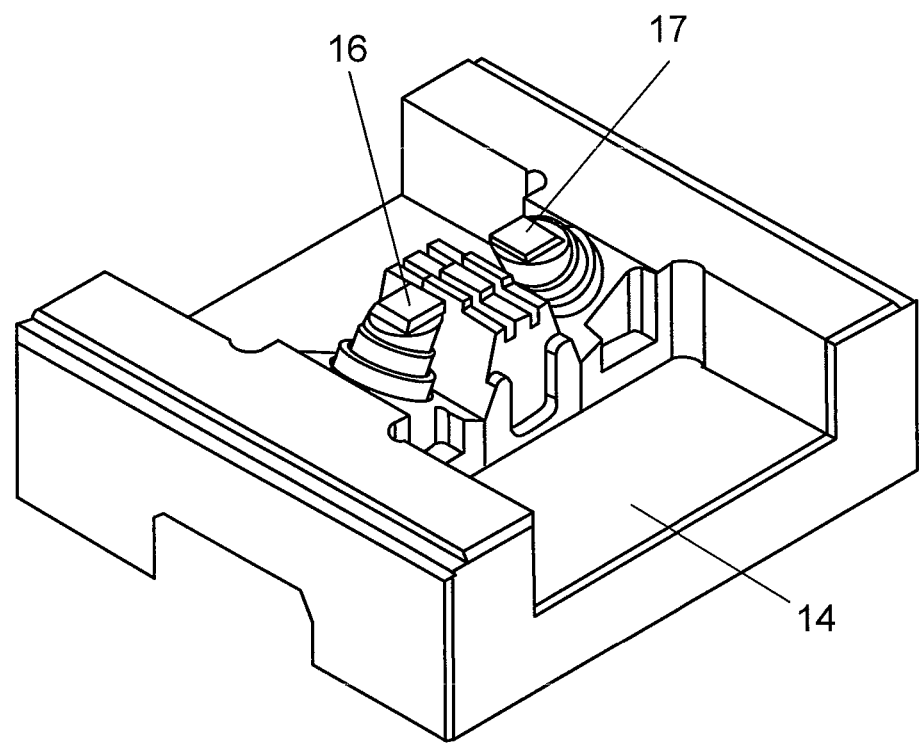
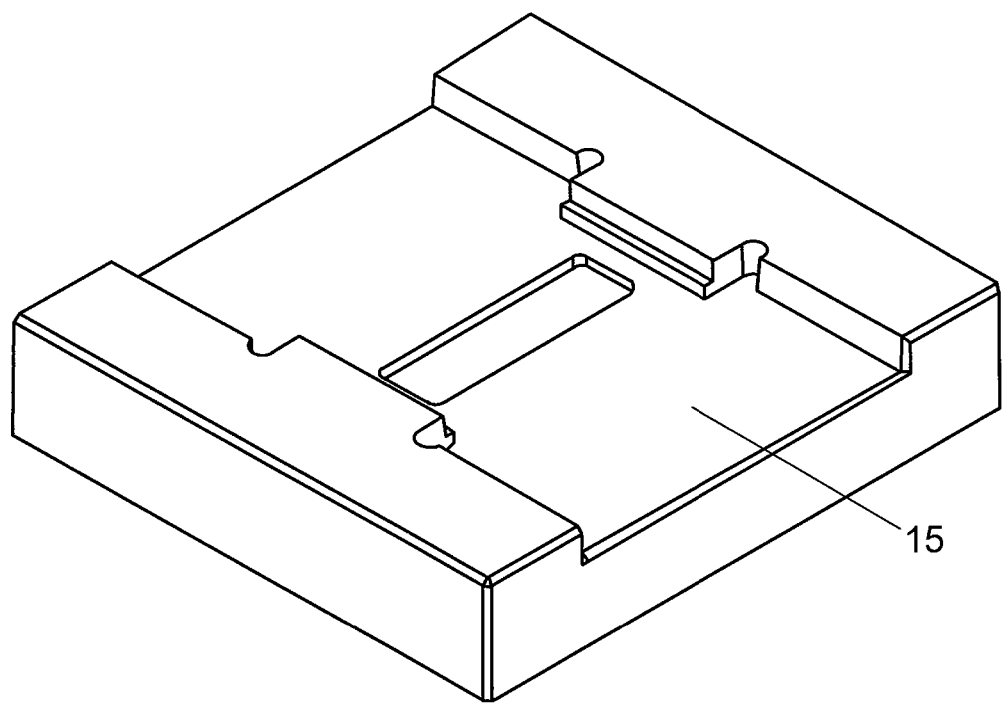

ULTRASONIC FLOW RATE MEASUREMENT DEVICE

This application is a 371 application of PCT/JP2012/002334 having an international filing date of Apr. 4, 2012, which claims priority to JP2011-083297 filed Apr. 5, 2011, the entire contents of which are incorporated herein by reference.

TECHNICAL FIELD

The present invention relates to an ultrasonic flow rate measurement device for measuring the flow rate of gas or the like.

BACKGROUND ART

Explanation will be made on a conventional ultrasonic flow rate measurement device.

FIG. 14 is a view showing the cross-sectional configuration of conventional ultrasonic flow rate measurement device 100.

As shown in FIG. 14, ultrasonic flow rate measurement device 100 is provided with flow rate measuring tube 121 that allows a fluid to be measured to flow from one side to the other side. Moreover, ultrasonic sensor 122a is disposed on an upstream side whereas another ultrasonic sensor 122b is disposed on a downstream side, wherein ultrasonic sensors 122a and 122b are disposed opposite to each other while holding flow rate measuring tube 121 therebetween at a predetermined angle with respect to the center line.

Ultrasonic sensors 122a and 122b are contained in recesses 125a and 125b formed in the flow rate measuring tube 121, respectively. Bulk-like ultrasonic wave transmitting members 123a and 123b are housed inside of recesses 125a and 125b, respectively, thereby preventing the intrusion of the fluid to be measured into recesses 125a and 125b, followed by measuring a flow rate (see, for example, Patent Literature 1).

Additionally, FIG. 15 is a view showing the cross-sectional configuration of another conventional ultrasonic flow rate measurement device 150. As shown in FIG. 15, ultrasonic flow rate measurement device 150 has recesses 125a and 125b, in which ultrasonic sensors 122a and 122b are contained, respectively. Suppressing members 124a and 124b for restricting a fluid to be measured from flowing toward the sensors are disposed at openings, through which ultrasonic waves go onto a channel, at recesses 125a and 125b (see, for example, Patent Literature 2).

However, in the above-described conventional configurations, ultrasonic wave transmitting members 123a and 123b or suppressing members 124a and 124b are provided for suppressing the fluid to be measured from flowing into recesses 125a and 125b. Consequently, the disturbance of the flow of the fluid to be measured becomes small at a measurement part (i.e., an ultrasonic wave propagation path) at flow rate measuring tube 121 and recesses 125a and 125b, thereby reducing the degradation of measurement accuracy. However, the above-described configurations require separate members, and therefore, there arises a problem of an increase in cost due to an increase in material cost or number of man-hours.

In addition, a reception level of an ultrasonic wave in ultrasonic sensors 122a and 122b drops, and therefore, there arises a problem of difficulty of reduction of a drive input into ultrasonic sensors 122a and 122b. In view of this, when a gas meter for measuring domestic fuel gas such as town gas or LPG (liquefied petroleum gas) is kept to be used with a small battery capacity for as long a period as ten years, there arises a problem of difficulty in reducing power consumption.

PTL 1: Unexamined Japanese Patent Publication No. S63-26537
PTL 2: Unexamined Japanese Patent Publication No. 2004-101542

SUMMARY OF THE INVENTION

In view of the above-described conventional problems to be solved, the present invention has been accomplished. The present invention provides an ultrasonic flow rate measurement device for suppressing an increase in cost while stabilizing measurement accuracy and lowering power consumption.

An ultrasonic flow rate measurement device according to the present invention includes a measurement channel, through which a fluid to be measured flows; and a sensor fixing casing having openings formed in the measurement channel and sensor fixing cavities communicating with the openings. Moreover, the ultrasonic flow rate measurement device includes a pair of ultrasonic sensors contained in the sensor fixing cavities, for measuring the flow rate of the fluid to be measured; and a flow rate measuring unit for detecting the flow rate based on an ultrasonic wave propagation time between the pair of ultrasonic sensors. Furthermore, the ultrasonic flow rate measurement device includes a suppressing member formed at each of the openings, for suppressing the fluid to be measured from intruding into each of the sensor fixing cavities, wherein the suppressing member is molded integrally with the sensor fixing casing.

With this configuration, the suppressing member for restricting a fluid from intruding into the sensor fixing cavity is molded at the same time when the sensor fixing casing is molded. Therefore, it is possible to prevent an increase in cost or an increase in the number of assembling man-hours without disposing a separate member, thus suppressing disturbance of a fluid to be measured, which may be produced in the sensor fixing cavity, so as to stabilize measurement accuracy and reduce power consumption.

BRIEF DESCRIPTION OF THE DRAWINGS

FIG. 5 is a perspective view showing the configuration of a die for use in molding a sensor fixing casing in the exemplary embodiment according to the present invention.

DETAILED DESCRIPTION OF THE PREFERRED EMBODIMENTS

Exemplary embodiments according to the present invention will be described below with reference to the attached drawings. Incidentally, these exemplary embodiments never limit the present invention.

First Exemplary Embodiment

Figure 1:
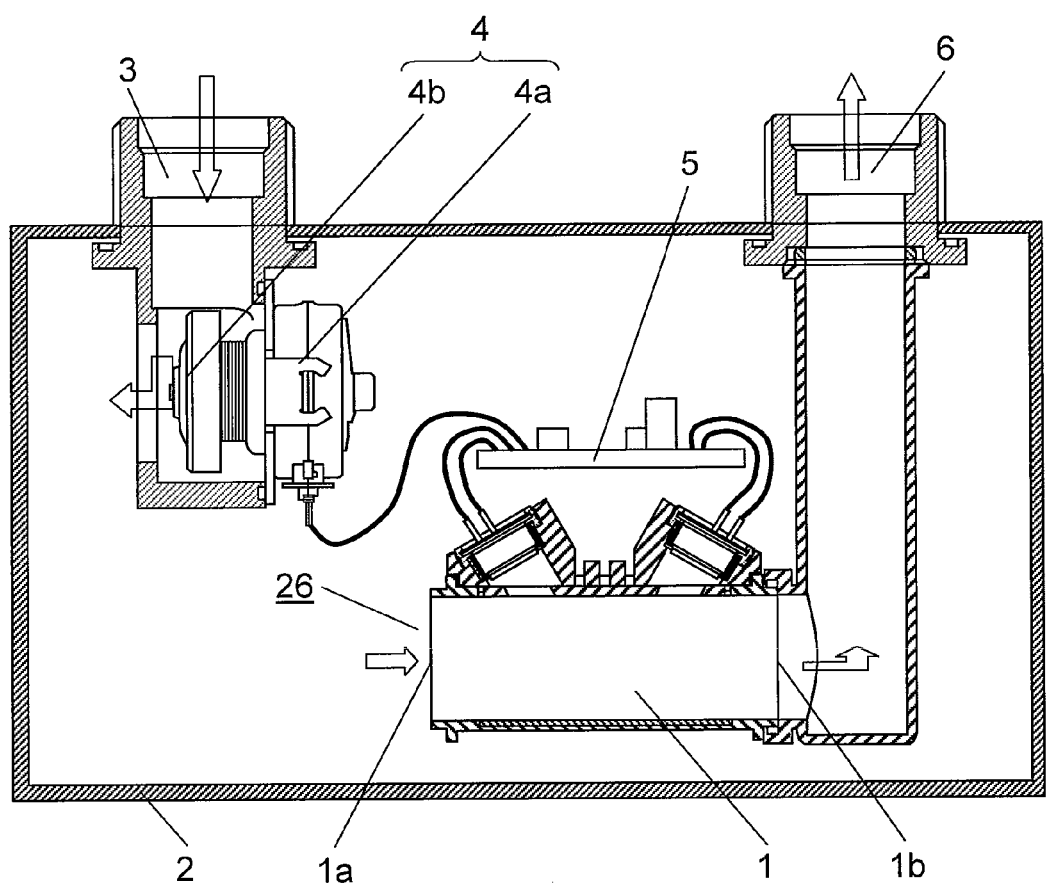
FIG. 1 is a cross-sectional view showing the configuration of an ultrasonic flow rate measurement device in an exemplary embodiment according to the present invention.

FIG. 1 is a cross-sectional view showing the configuration of ultrasonic flow rate measurement device 50 in an exemplary embodiment according to the present invention. In FIG. 1, hollow arrows indicate flows of a fluid (i.e., a fluid to be measured).

As shown in FIG. 1, ultrasonic flow rate measurement device 50 is provided with fluid supply path 3. Fluid supply path 3 is provided with, on the way of a channel, cutoff valve 4 including drive 4a having an electromagnet device such as a stepping motor and valve body 4b in association with drive 4a, wherein valve body 4b is adapted to open or close cutoff valve 4. When cutoff valve 4 is released, a fluid to be measured is allowed to flow from fluid supply path 3 into meter casing 2. Ultrasonic flow rate measurement device 50 is provided with measurement channel 1, through which the fluid to be measured flows. Measurement channel 1 is formed into a rectangular shape in cross section such as a rectangle. The fluid to be measured filling up meter casing 2 flows into measurement channel 1 through inlet side 1a of measurement channel 1, and further, flows outward of meter casing 2 through fluid outflow path 6 connected to downstream side 1b of measurement channel 1.

Here, cutoff valve 4 is designed to be closed when the fluid abnormally flows or an earthquake is detected by a seismoscope (not shown). When cutoff valve 4 is closed, the fluid to be measured cannot flow into meter casing 2 from fluid supply path 3.

Figure 2:
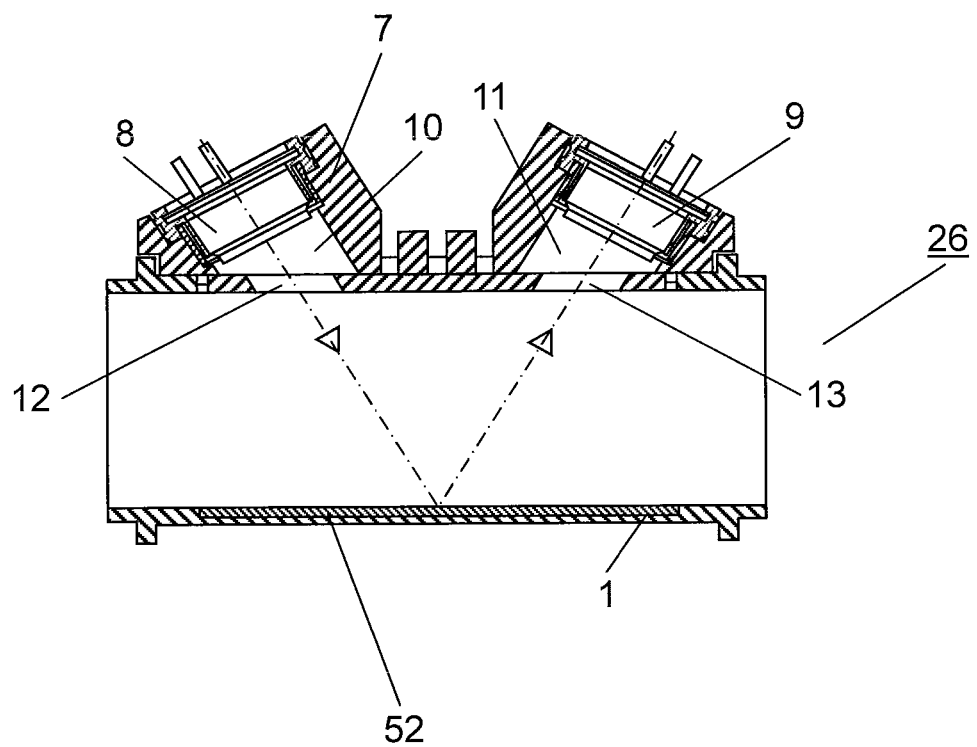
FIG. 2 is a cross-sectional view showing a flow rate measuring unit in the exemplary embodiment according to the present invention.

Ultrasonic flow rate measurement device 50 is provided with flow rate measuring unit 26. FIG. 2 is a cross-sectional view showing flow rate measuring unit 26 in the exemplary embodiment according to the present invention.

When measurement channel 1 is formed into a rectangular shape in cross section, sensor fixing casing 7 is connected onto a short side, for example. A pair of ultrasonic sensors 8 and 9 constituting a flow rate detecting unit is arranged in such a manner as to transmit and receive an ultrasonic wave reflected on an opposite wall 52. Ultrasonic sensors 8 and 9 are contained in sensor fixing cavities 10 and 11 inclined with respect to measurement channel 1, respectively. An ultrasonic wave is propagated inside of measurement channel 1 through openings 12 and 13 formed at measurement channel 1 of sensor fixing casing 7 between ultrasonic sensors 8 and 9. At openings 12 and 13 are disposed suppressing members 20 (see FIG. 8) for suppressing the fluid to be measured from flowing into sensor fixing cavities 10 and 11. Although the configuration and function of suppressing member 20 will be described later, suppressing member 20 is molded integrally with sensor fixing casing 7. Sensor fixing cavities 10 and 11 communicate with openings 12 and 13, respectively.

Here, the arrangement of the pair of ultrasonic sensors 8 and 9 is not limited to the above-described example. Ultrasonic sensors 8 and 9 may be satisfactorily disposed at the same side of measurement channel 1, thus configuring an ultrasonic wave propagation path utilizing the reflection on the opposite wall. In this manner, measurement channel 1 can be reduced in size.

Control unit 5 (see FIG. 1) drives ultrasonic sensors 8 and 9, measures a propagation time of an ultrasonic wave, detects a flow rate, and further, drives cutoff valve 4 at the time of abnormality.

Figure 3:
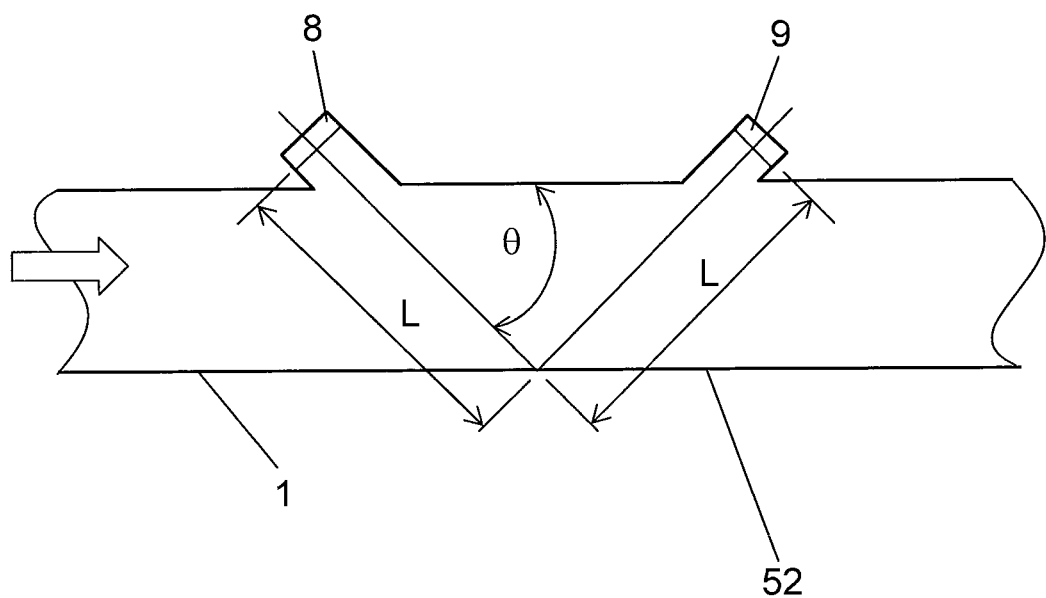
FIG. 3 is a view explanatory of a flow rate measuring operation with an ultrasonic wave in the exemplary embodiment according to the present invention.

Next, explanation will be made on a flow rate measuring operation with an ultrasonic wave by using ultrasonic flow rate measurement device 50. FIG. 3 is a view explanatory of a flow rate measuring operation with an ultrasonic wave in the exemplary embodiment according to the present invention.

In the present exemplary embodiment, ultrasonic sensors 8 and 9 are disposed on the same plane as the rectangular cross-section of measurement channel 1, thus unifying ultrasonic sensors 8 and 9 with each other.

As a consequence, the propagation channel for transmitting or receiving an ultrasonic wave is formed into a V shape turned over on opposite wall 52. In this manner, the ultrasonic wave is transmitted or received between ultrasonic sensors 8 and 9 upstream and downstream arranged, respectively.

With the above-described configuration, measurement is carried out with respect to propagation time T1 until downstream ultrasonic sensor 9 receives the ultrasonic wave emitting from upstream ultrasonic sensor 8. In contrast, measurement is carried out with respect to propagation time T2 until upstream ultrasonic sensor 8 receives the ultrasonic wave emitting from downstream ultrasonic sensor 9.

A flow rate is calculated in a computer in control unit 5 functioning as a flow rate measuring unit according to equations below based on propagation times T1 and T2 measured in the above-described manner. The flow rate measuring unit detects the flow rate of a fluid to be measured based on the propagation times of the ultrasonic waves transmitted and received between ultrasonic sensors 8 and 9.

Reference character V represents a flow rate of a fluid to be measured in a flow direction of measurement channel 1. Moreover, as shown in FIG. 3, assuming that reference symbol θ denotes an angle formed between the flow direction of measurement channel 1 and an ultrasonic wave propagation path; 2×L, a distance of the ultrasonic wave propagation path between ultrasonic sensors 8 and 9; and C, a velocity of sound of the fluid to be measured, flow rate V is calculated based on the following equations.

$$T1 = 2 \times L/(C + V \cos \theta) \quad (1)$$

$$T2 = 2 \times L/(C + V \cos \theta) \quad (2)$$

In Equations (1) and (2), the velocity C of sound is erased based on an expression for subtracting the reciprocal of T2 from the reciprocal of T1, thus obtaining Equation (3).

$$V = (2 \times L/2 \cos \theta)(1/T1) - (1/T2)) \quad (3)$$

Here, since angle θ and distance L have been already known, flow rate V can be calculated based on propagation times T1 and T2. In consideration of measurement of a flow rate of air, assuming that angle θ is 45°, distance L is 35 mm, velocity C of sound is 340 m/s, and flow rate V is 8 m/s, T1 is $2.0 \times 10^{-4}$ sec. and T2 is $2.1 \times 10^{-4}$ sec. In other words, instant measurement can be achieved.

Incidentally, the ultrasonic wave propagation path between ultrasonic sensors 8 and 9 is not always limited to the above-described V-shaped propagation path. For example, with propagation paths having other configurations, a flow rate can be also measured as long as a propagation path traverses measurement channel 1 at least once and the propagation time of an ultrasonic wave depends upon a change in flow rate.

Subsequently, a description will be given of a molding method for sensor fixing casing 7 in the exemplary embodiment according to the present invention.

Figure 4:
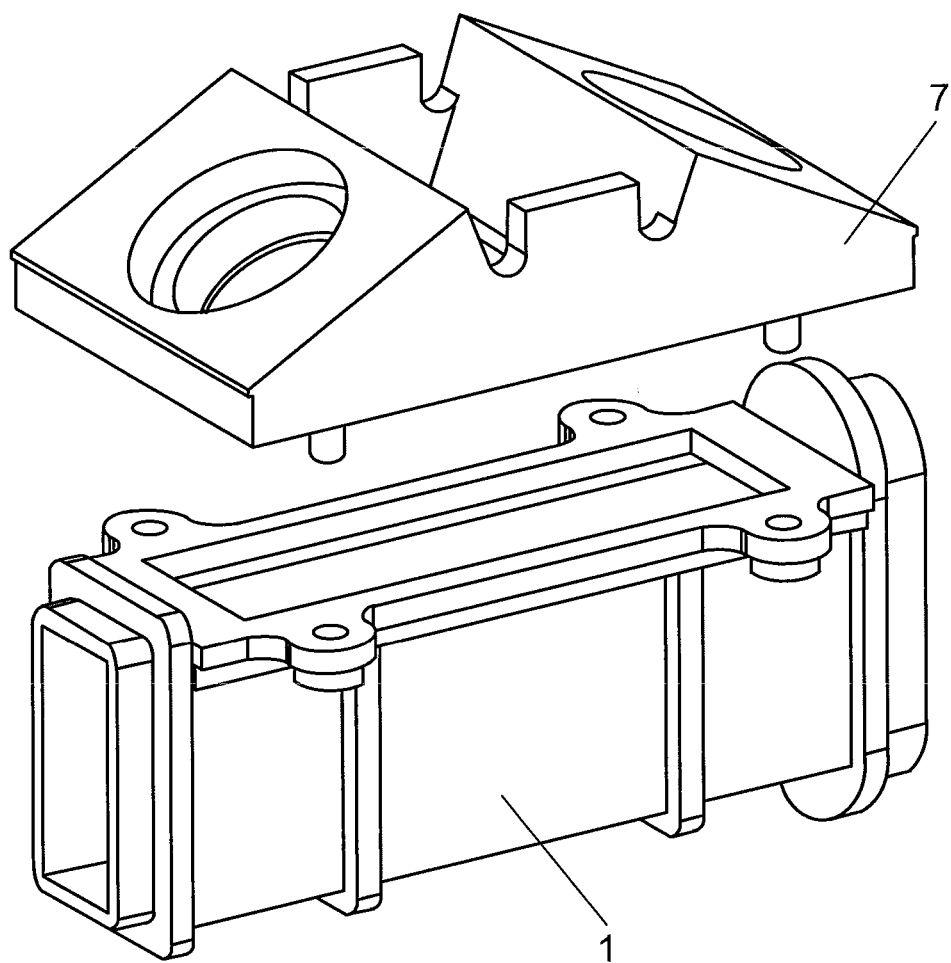
FIG. 4 is an exploded perspective view showing the configuration of the flow rate measuring unit in the exemplary embodiment according to the present invention.

FIG. 4 is an exploded perspective view showing the configuration of flow rate measuring unit 26 in the exemplary embodiment according to the present invention.

As shown in FIG. 4, flow rate measuring unit 26 is constituted of two molded parts: namely, sensor fixing casing 7 and measurement channel 1.

FIG. 5 is a perspective view showing the configuration of a die for use in molding sensor fixing casing 7 in the exemplary embodiment according to the present invention.

As shown in FIG. 5, a die for molding sensor fixing casing 7 is constituted of upper die 14 and lower die 15. Upper die 14 includes slider dies 16 and 17 for forming cavities, in which ultrasonic sensors 8 and 9 are contained. Sensor fixing cavities 10 and 11 and openings 12 and 13 are molded with slider dies 16 and 17, respectively.

Here, the function and effect of ultrasonic flow rate measurement device 50 having suppressing members 20 will be described in the exemplary embodiment according to the present invention.

Figure 6:
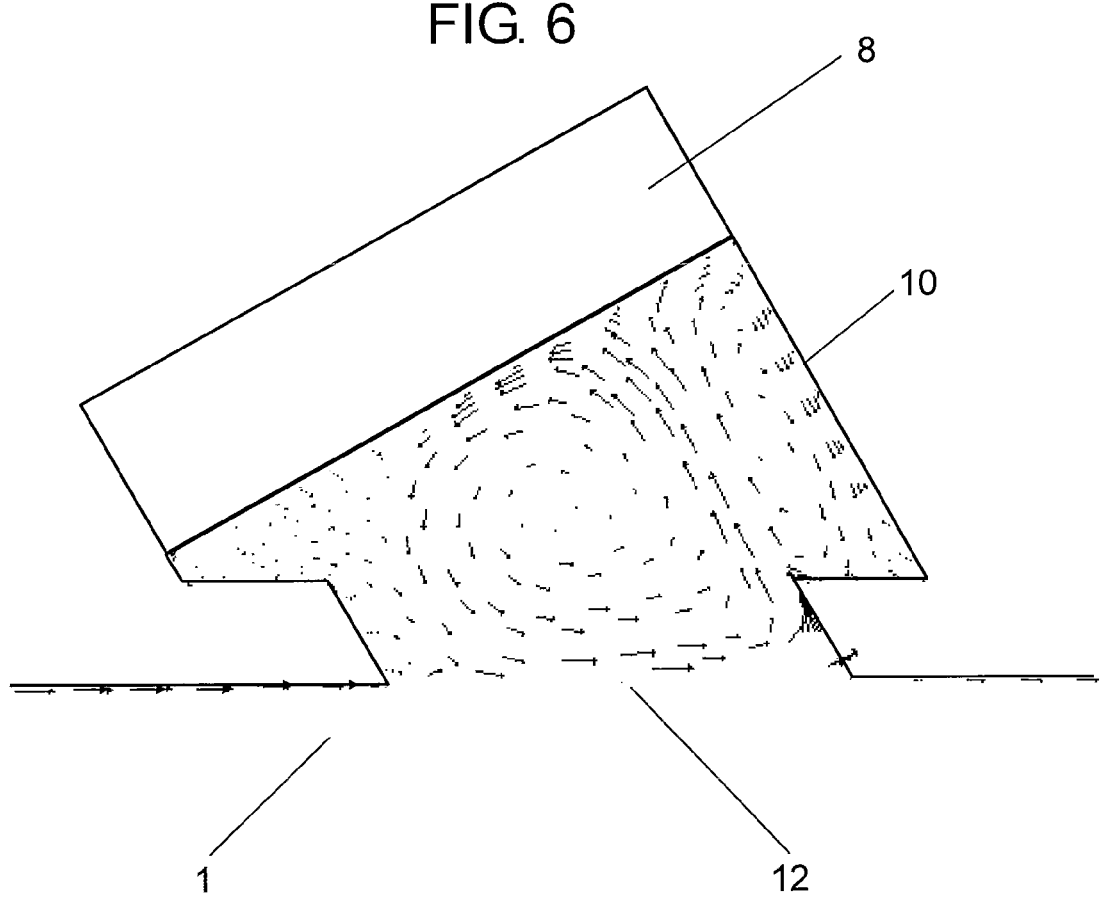
FIG. 6 is a diagram illustrating the result of the fluid analysis of a flow of a fluid to be measured in the case where no suppressing member is disposed at an opening of an ultrasonic wave propagating portion in the exemplary embodiment according to the present invention.

FIG. 6 is a diagram illustrating the result of the fluid analysis of a flow of a fluid to be measured in the case where no suppressing member is disposed at opening 12 of an ultrasonic wave propagating portion in the exemplary embodiment according to the present invention.

As shown in FIG. 6, a large vortex is produced in sensor fixing cavity 10 as a clearance defined between ultrasonic sensor 8 and measurement channel 1. When the ultrasonic wave propagates this clearance, the vortex disturbs the ultrasonic wave. Consequently, a propagation time to be measured has an error, and therefore, it is difficult to accurately measure the flow rate of the fluid passing measurement channel 1.

Conventionally, in order to prevent the fluid to be measured from flowing in sensor fixing cavity 10, a suppressing member such as wire netting has been separately provided at the opening extending from sensor fixing cavity 10 toward measurement channel 1. However, a strong demand for avoiding this method as much as possible has arisen from the viewpoints of cost reduction and reduction of assembling man-hours since it has been necessary to attach the separate suppressing member to the opening.

Sensor fixing casing 7 in the exemplary embodiment according to the present invention is fabricated by using a molding method with a die. At this time, sensor fixing cavities 10 and 11 for use in fixing the sensors are integrally molded by inserting auxiliary dies, that is, slider dies 16 and 17 into the dies for molding a sensor fixing body.

Figure 7:
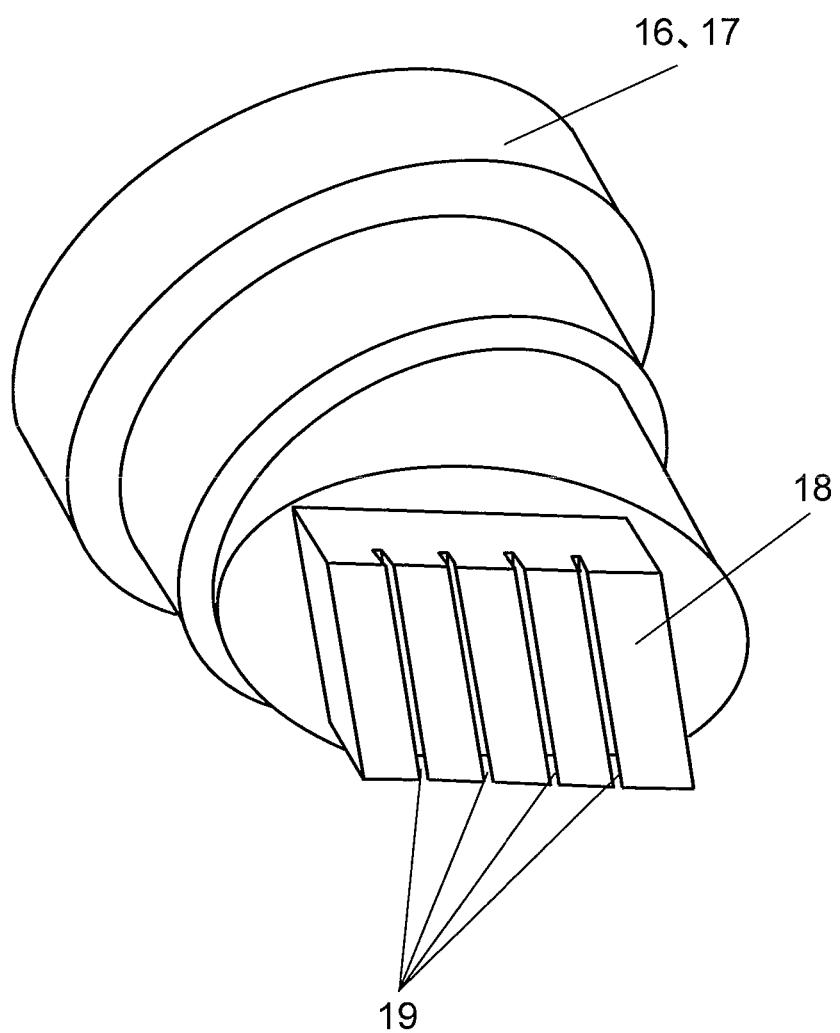
FIG. 7 is a perspective view showing the configuration of a slider die in a first exemplary embodiment according to the present invention.

FIG. 7 is a perspective view showing the configuration of slider dies 16 and 17 in a first exemplary embodiment according to the present invention. Moreover, FIG. 8 is a perspective view showing the configuration of sensor fixing casing 7 in the first exemplary embodiment according to the present invention.

As shown in FIG. 7, each of slider dies 16 and 17 has flat portion 18 in abutment against lower die 15 at the tip thereof so as to form each of openings 12 and 13. Flat portion 18 is constituted of the same plane as the wall surface of measurement channel 1 continuous to each of openings 12 and 13. Consequently, the wall surface of measurement channel 1 can be integrated with suppressing member 20 at openings 12 and 13, so as to produce a smooth flow inside of measurement channel 1, thus stably measuring the flow rate.

In addition, flat portion 18 has a plurality of slits 19 that are linear and perpendicular with respect to the flow of the fluid to be measured inside of measurement channel 1. Here, slit 19 is constituted such that the depth direction thereof is perpendicular to an ultrasonic wave emission surface of each of ultrasonic sensors 8 and 9. Suppressing member 20 is constituted of slits 19 formed at the tip of each of slider dies 16 and 17.

Figure 8:
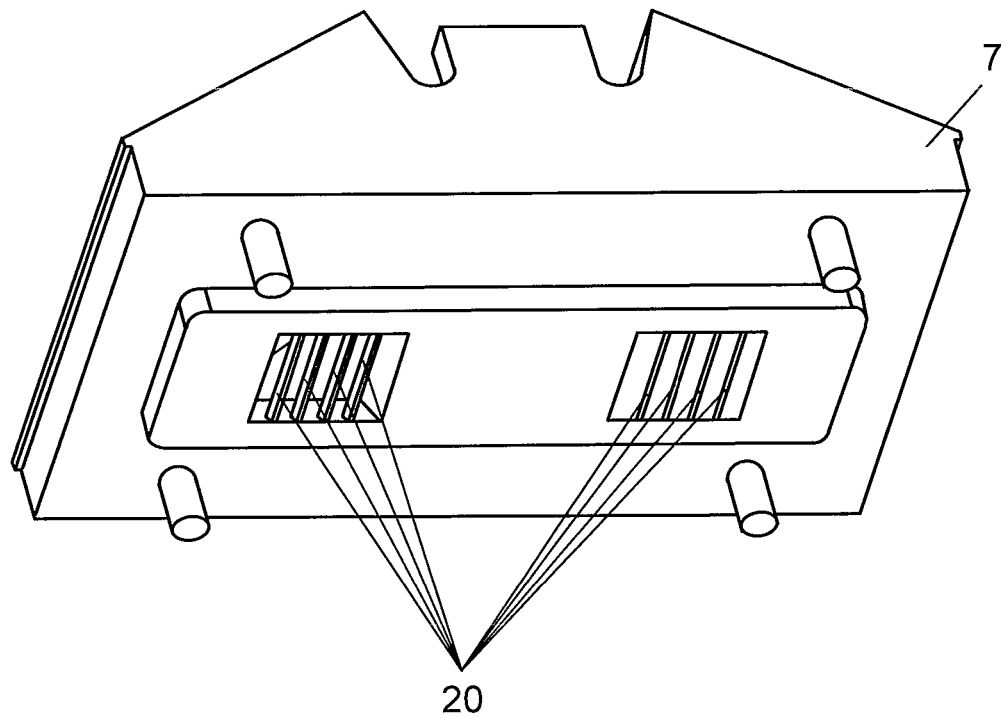
FIG. 8 is a perspective view showing the configuration of a sensor fixing casing in the first exemplary embodiment according to the present invention.

In this manner, as shown in FIG. 8, casing constituting material intrudes into slits 19 when sensor fixing casing 7 is molded, so that suppressing member 20 for suppressing the intrusion of the fluid to be measured can be integrally formed in sensor fixing cavity 10. Additionally, the intrusion of the fluid to be measured can be suppressed as much as possible, and further, an adverse influence on attenuation of the ultrasonic propagation can be reduced.

Figure 9:
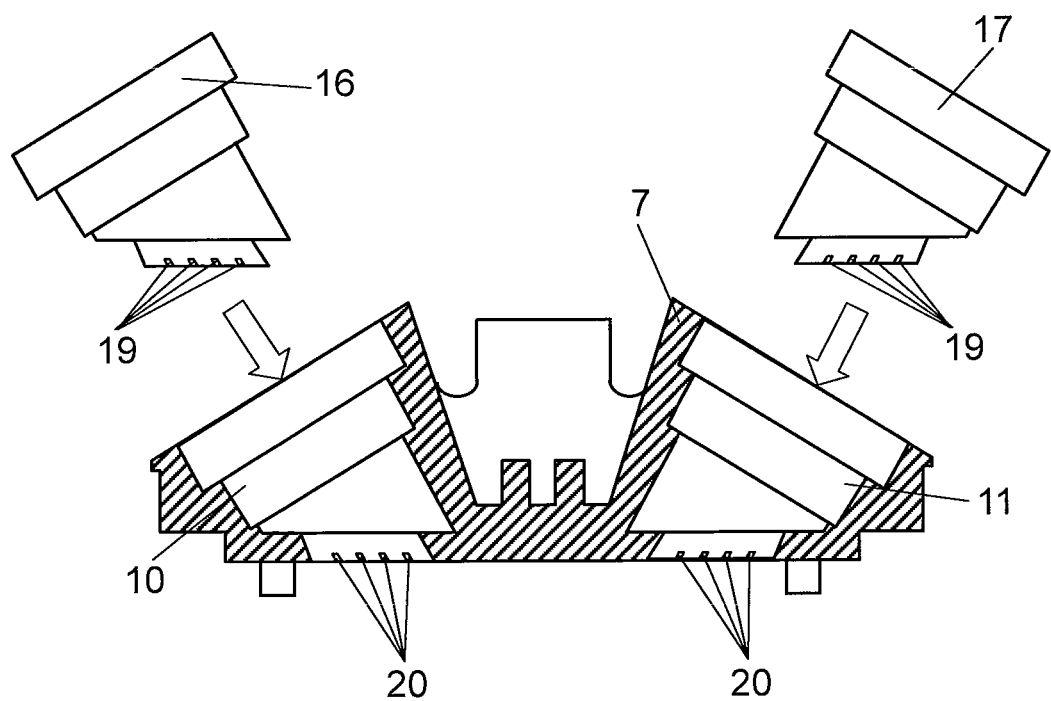
FIG. 9 is a view illustrating the relationship between the sensor fixing casing and the slider die in the first exemplary embodiment according to the present invention.

FIG. 9 is a view illustrating the relationship between sensor fixing casing 7 and slider dies 16 and 17 in the first exemplary embodiment according to the present invention. FIG. 9 illustrates the relationship between the cross-sectional configuration of sensor fixing casing 7 shown in FIG. 8 and the side surfaces of slider dies 16 and 17. As illustrated in FIG. 9, molding with slider dies 16 and 17 enables suppressing members 20 to be constituted at positions corresponding to slits 19 formed at slider dies 16 and 17 in sensor fixing casing 7.

Figure 10:
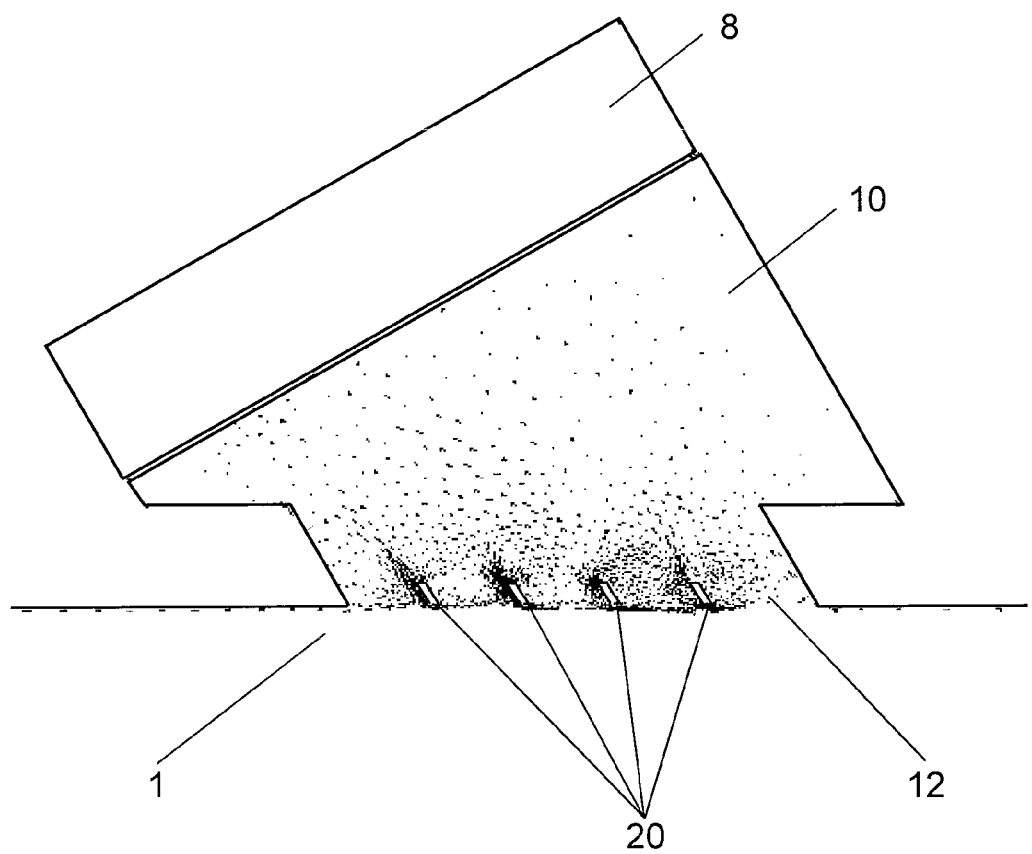
FIG. 10 is a diagram illustrating the result of a fluid analysis with an advantage of a suppressing member in the first exemplary embodiment according to the present invention.

FIG. 10 is a diagram illustrating the result of a fluid analysis with an advantage of suppressing member 20 in the first exemplary embodiment according to the present invention.

As illustrated in FIG. 10, the disturbance of the flow such as the vortex can be eliminated in sensor fixing cavity 10 formed at ultrasonic sensor 8 in comparison with the case where no suppressing member 20 is disposed at opening 12 illustrated in FIG. 6. Incidentally, the function of suppressing member 20 is fulfilled in the same manner at sensor fixing cavity 11 formed at ultrasonic sensor 9.

As described above, in the present exemplary embodiment, only the formation of the slits at slider dies 16 and 17 can suppress the intrusion of the fluid to be measured into sensor fixing cavities 10 and 11 when the die of sensor fixing casing 7 is fabricated, so as to enhance measurement accuracy. Moreover, no separate member is needed, unlike the conventional apparatus, thus reducing a material cost and the number of man-hours.

Second Exemplary Embodiment

Figure 11:
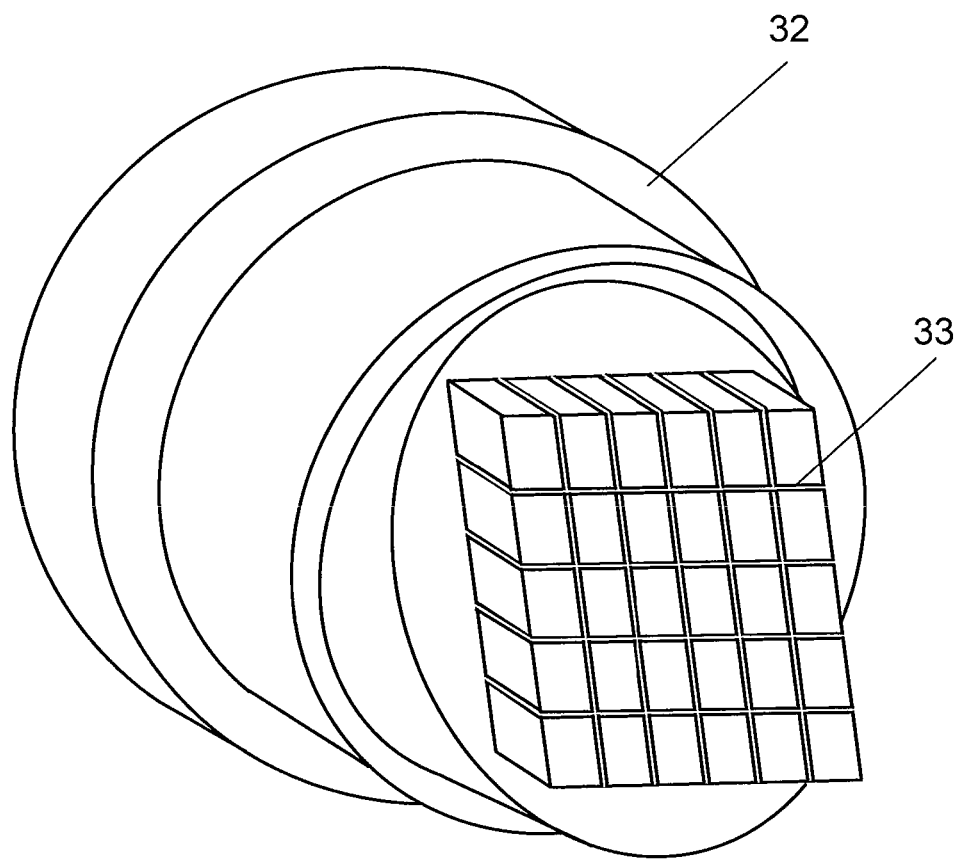
FIG. 11 is a perspective view showing the configuration of a slider die in a second exemplary embodiment according to the present invention.
Figure 12:
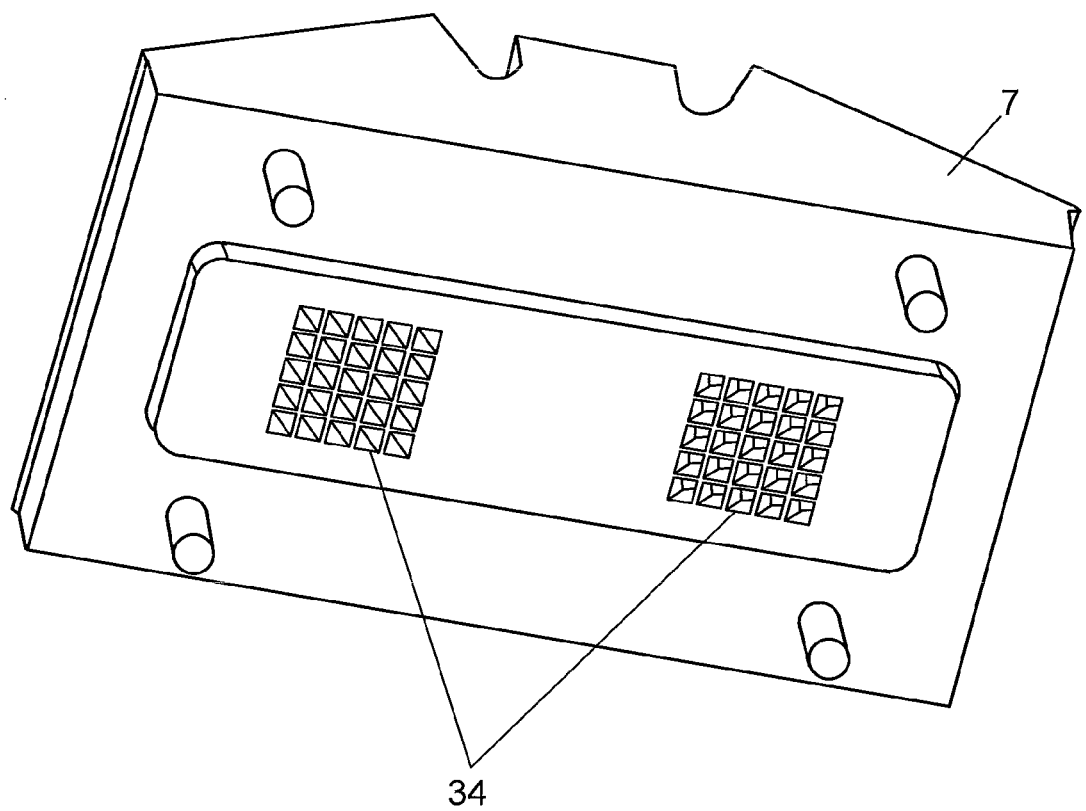
FIG. 12 is a perspective view showing the configuration of a sensor fixing casing in the second exemplary embodiment according to the present invention.

FIG. 11 is a perspective view showing the configuration of slider die 32 in a second exemplary embodiment according to the present invention. FIG. 12 is a perspective view showing the configuration of sensor fixing casing 7 in the second exemplary embodiment according to the present invention.

The configurations of ultrasonic flow rate measurement device 50 and a die in the present exemplary embodiment are the same as those in the first exemplary embodiment except the configuration of slider die 32, and therefore, their explanations will be omitted.

As shown in FIG. 11, grid-like slits 33 are formed at the tip of slider die 32 in the present exemplary embodiment. Slits 33 are formed perpendicularly to a flow inside of measurement channel 1. Slits 33 are configured such that their depth direction is perpendicular to the ultrasonic wave emission surfaces of a pair of ultrasonic sensors 8 and 9. Grid-like suppressing member 34 after being molded is opened perpendicularly to transmission surfaces of ultrasonic sensors 8 and 9, so that the disturbance of a flow such as a vortex produced at openings 12 and 13 can be dispersed less largely, thus restricting intrusion of a fluid to be measured with better performance.

Sensor fixing casing 7 is molded with slider die 32 in the same manner as that in the first exemplary embodiment. In this manner, grid-like suppressing member 34 shown in FIG. 12 can be formed integrally with sensor fixing casing 7, thus further producing the effect of suppressing the disturbance of the fluid to be measured at sensor fixing cavities 10 and 11.

A dyadic configuration constituted of measurement channel 1 and sensor fixing casing 7 is essential when a separate intrusion suppressing member such as wire netting is needed, like in the conventional apparatus. However, it is unnecessary to provide any separate suppressing member in molding in each of the exemplary embodiments, and therefore, sensor fixing casing 7 and measurement channel 1 can be molded integrally with each other. In other words, sensor fixing casing 7 and measurement channel 1 are constituted as a single unit. Thus, it is possible to further reduce the number of assembling man-hours so as to reduce the cost. Moreover, the integral molding can eliminate variations in accuracy due to assembling work so as to further achieve highly accurate measurement.

Incidentally, the above-described detailed specifications may depend upon the configuration of measurement channel 1. Thus, the present invention is not limited to the above-described exemplary embodiments.

Figure 13:
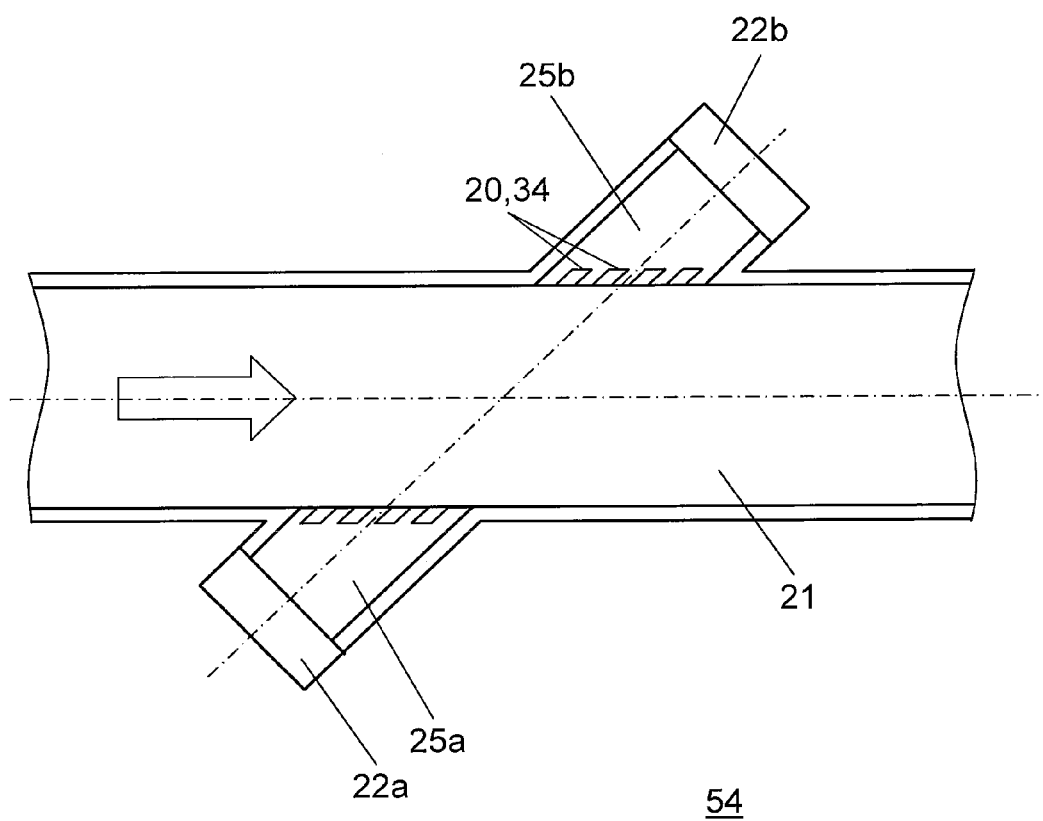
FIG. 13 is a view showing the cross-sectional configuration of an ultrasonic flow rate measurement device in the second exemplary embodiment according to the present invention by way of another example.
Figure 14:
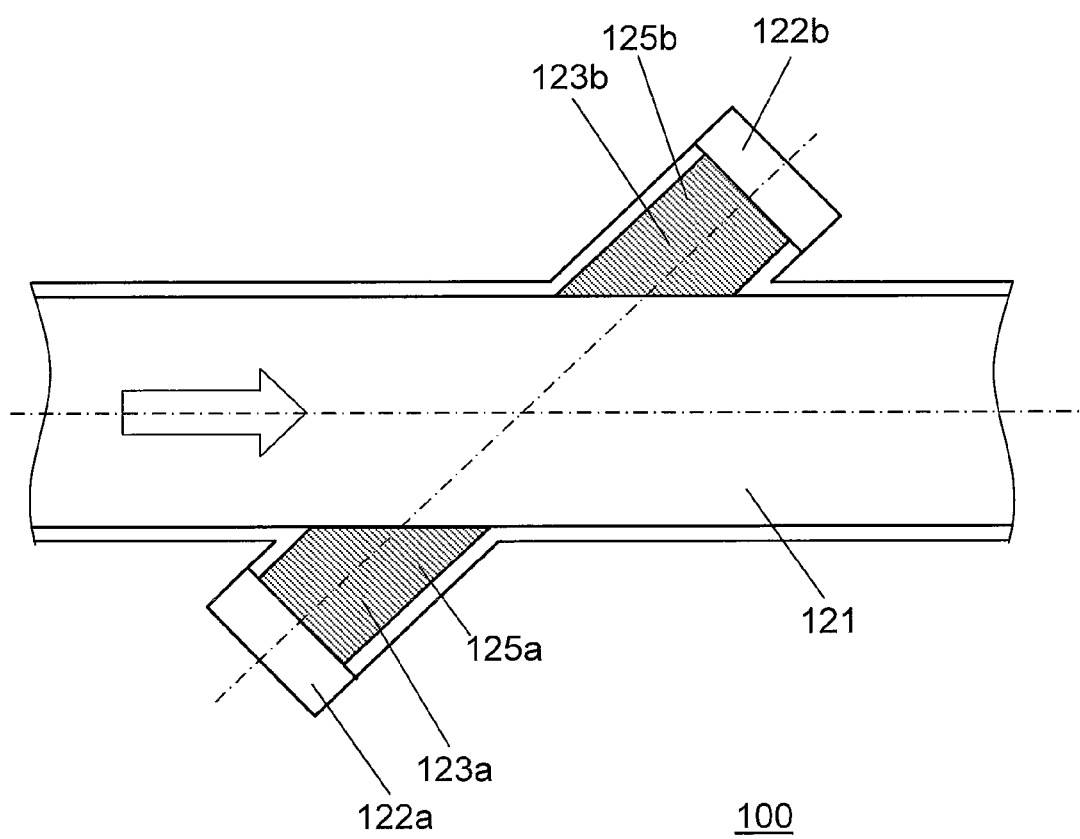
FIG. 14 is a view showing the cross-sectional configuration of a conventional ultrasonic flow rate measurement device.
Figure 15:
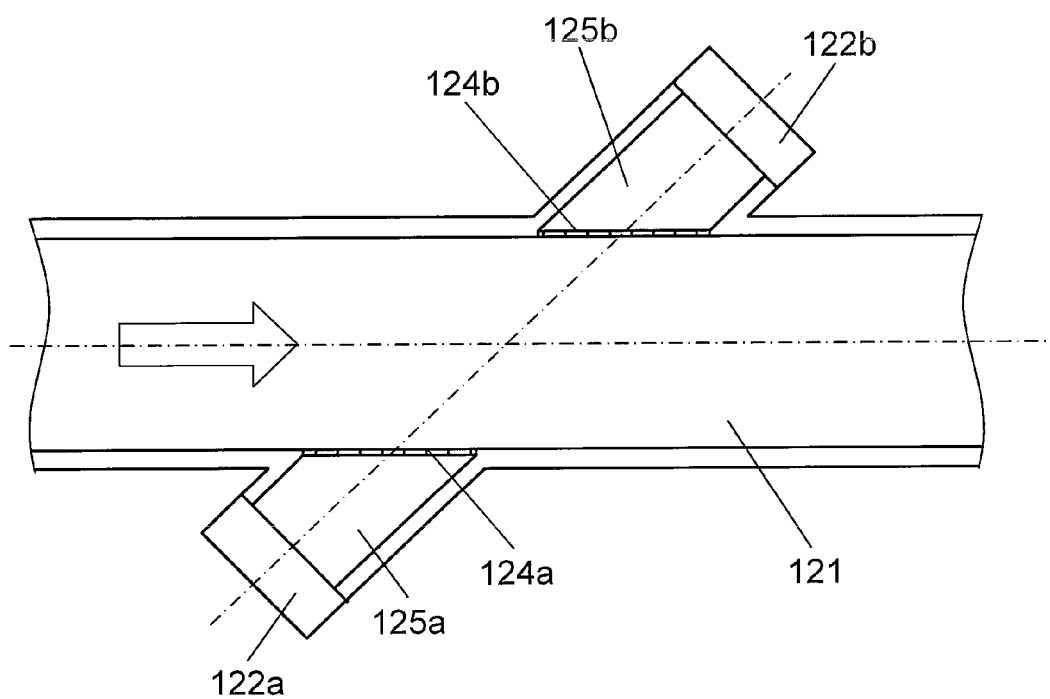
FIG. 15 is a view showing the cross-sectional configuration of another conventional ultrasonic flow rate measurement device.

FIG. 13 is a view showing the cross-sectional configuration of ultrasonic flow rate measurement device 54 in the second exemplary embodiment according to the present invention by way of another example.

As shown in FIG. 13, ultrasonic flow rate measurement device 54 is provided with flow rate measuring tube 21 (i.e., a measurement channel) that allows a fluid to be measured to flow from one side to the other side. Moreover, ultrasonic sensor 22a is disposed on an upstream side whereas another ultrasonic sensor 22b is disposed on a downstream side, wherein ultrasonic sensors 22a and 22b are disposed opposite to each other while holding flow rate measuring tube 21 therebetween at a predetermined angle with respect to the center line.

Ultrasonic sensors 22a and 22b are contained in recesses (i.e., sensor fixing cavities) 25a and 25b formed in flow rate measuring tube 21, respectively. The above-described suppressing member 20 or 34 may be integrated with flow rate measuring tube 21 at an opening continuous to flow rate measuring tube 21, of each of recesses 25a and 25b. In this manner, it is possible to prevent the fluid to be measured from intruding into recesses 25a and 25b, so as to measure the flow rate with high accuracy.

As described above, in the ultrasonic flow rate measurement device in the present exemplary embodiments, the suppressing member for suppressing the fluid to be measured from intruding into the sensor fixing cavity is formed at the same time when the casing is molded. As a consequence, it is possible to achieve the stable measurement performance, the cost reduction, and the miniaturization. Moreover, compared with the conventional suppressing member using wire netting or the like, the aperture of the opening can be more enlarged. Consequently, the suppressing member hardly interferes with the ultrasonic wave that passes, and further, sensitivity in transmitting and receiving the ultrasonic wave is hardly degraded. Hence, the drive input for the ultrasonic sensor can be reduced, thus reducing power consumption.

INDUSTRIAL APPLICABILITY

As described above, the present invention can produce remarkable effects that an increase in cost is suppressed while the measurement accuracy can be stabilized and power consumption can be reduced. Therefore, the ultrasonic flow rate measurement device according to the present invention is useful as an ultrasonic flow rate measurement device for measuring the flow rate of various kinds of fluids in addition to a gas meter.

The invention claimed is:

1. An ultrasonic flow rate measurement device comprising:
   a measurement channel through which a fluid to be measured flows;
   a sensor fixing casing having openings formed in the measurement channel and sensor fixing cavities communicating with the openings;
   a pair of ultrasonic sensors contained in the sensor fixing cavities for measuring a flow rate of the fluid to be measured;
   a flow rate measuring unit for detecting the flow rate based on an ultrasonic wave propagation time between the pair of ultrasonic sensors; and
   suppressing members formed integrally with the sensor fixing casing at each of the openings for suppressing the fluid to be measured from intruding into each of the sensor fixing cavities,
   wherein the suppressing member includes a plurality of slits that span the openings.

2. An ultrasonic flow rate measurement device according to claim 1,
   wherein the sensor fixing casing and the measurement channel are constituted integrally with each other.

3. An ultrasonic flow rate measurement device according to claim 1,
   wherein the pair of ultrasonic sensors is disposed at a same side surface of the measurement channel, thus constituting an ultrasonic wave propagation path utilizing reflection on a wall surface on an opposite side.

4. An ultrasonic flow rate measurement device according to claim 1,
   wherein the sensor fixing cavity and the opening are formed in a mold into which a slider die is inserted during casting of the sensor fixing casing, wherein the slider die defines slits at a tip of the slider die that define the plurality of slits of the suppressing members that span the openings.

5. An ultrasonic flow rate measurement device according to claim 4,
   wherein the tip of the slider die has a same plane as a wall surface of the measurement channel continuous to the opening.

6. An ultrasonic flow rate measurement device according to claim 4,
wherein the slits formed at the tip of the slider die are formed linearly in a direction perpendicular to a flow in the measurement channel, and
a depth direction of the slits is perpendicular to ultrasonic wave emission surfaces of the pair of ultrasonic sensors.

7. An ultrasonic flow rate measurement device according to claim 4,
wherein the slits at the tip of the slider die are formed into a grid shape;
the slits are formed perpendicularly to a flow inside of the measurement channel, and
a depth direction of the slits is perpendicular to ultrasonic wave emission surfaces of the pair of ultrasonic sensors.

* * * * *